Patented Jan. 9, 1923.

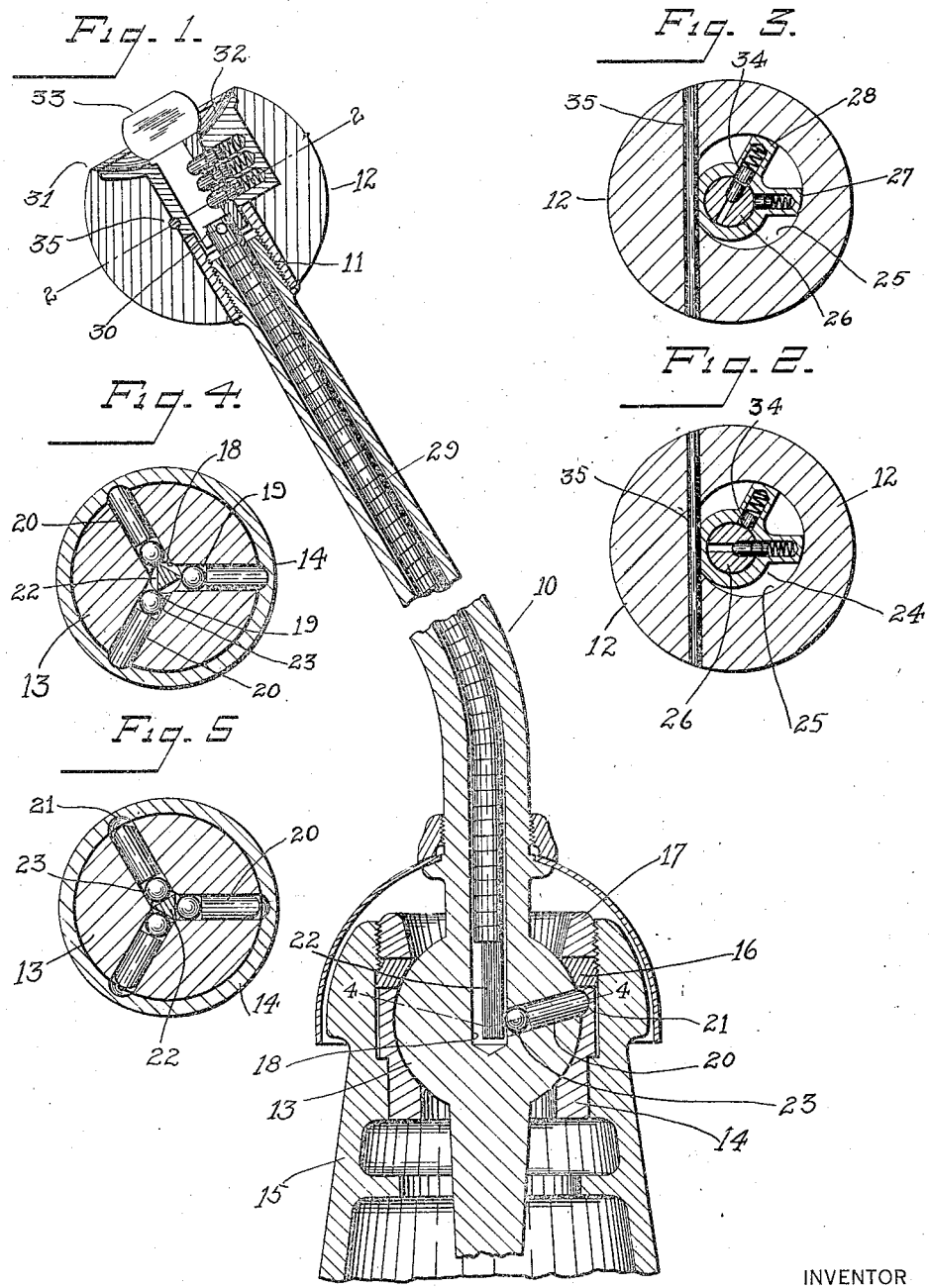

1,441,313

UNITED STATES PATENT OFFICE.

HENRY G. VOIGHT, OF NEW HAVEN, CONNECTICUT, ASSIGNOR TO SARGENT & COMPANY, OF NEW HAVEN, CONNECTICUT, A CORPORATION OF CONNECTICUT.

LEVER LOCK.

Application filed April 9, 1919. Serial No. 288,668.

*To all whom it may concern:*

Be it known that I, HENRY G. VOIGHT, a citizen of the United States, residing in New Haven, county of New Haven, and State of Connecticut, have invented certain new and useful Improvements in a Lever Lock, of which the following is a full, clear, and exact description.

This invention relates to a lever lock and particularly to a key operable locking device for locking the gear shift lever of an automobile against unauthorized manipulation.

One object of my invention is to provide compact means housed entirely within a gear shift lever for locking the same in its neutral position.

Another object of my invention is to provide locking means within the spherical bearings member of a lever of the universal swinging type for locking the lever against unauthorized manipulation.

Another object of my invention is to provide lock means of the type just mentioned with sliding locking pins which are so constructed that a slight movement of the gear shift lever serves to retract these pins when the same are not locked in their extended position, thereby avoiding the necessity of providing springs or the like to return the pins to their retracted position.

Still another object of my invention is to provide a gear shift lever of the universal swinging type with a pin tumbler lock having a key barrel constructed to be rotated manually from its unlocked to its locked position without the use of a key, to thereby lock the lever in its neutral position without necessitating the use of a key.

To these and other ends, the invention consists in the novel features and combinations of parts to be hereinafter described and claimed.

In the accompanying drawing:

Fig. 1 is a vertical sectional view through a gear shift lever and its supporting bearing member having my invention applied thereto, the parts being shown in locked position.

Fig. 2 is a sectional view taken on the line 2—2 of Fig. 1, showing the key barrel in its locked position.

Fig. 3 is a view similar to Fig. 2 showing the key barrel in its unlocked position.

Fig. 4 is a sectional view substantially on the line 4—4 of Fig. 1, showing the sliding pins within the spherical bearing member in their locked position, and Fig. 5 is a view similar to Fig. 4, but showing these pins in their unlocked position.

In the embodiment of my invention illustrated in the drawing, I have designated by the numeral 10 a gear shift lever of the universal swinging type, the same preferably being bent axially in order that it may be more conveniently operated by the person driving the automobile in which the same is provided.

The upper end of this lever is preferably threaded, as indicated by 11, to receive a knob or the like 12, which is adapted to be conveniently grasped by the hand in operating this lever. An intermediate portion of this lever is provided with a spherical bearing member 13, which is seated in a substantial spherical socket member 14, the same being seated in a hollow casting or bracket 15 in which the lower end of the gear shift lever operates. The bearing member 13 is preferably retained properly seated upon the socket member 14 by means of a suitable packing washer 16 and a threaded gland nut 17, which engages the cooperating threads in the upper end of the hollow casting 15. The structure, so far described, is a well-known type of gear shift lever and universal mounting for the same, and since the same forms no part of my invention, it believed that further description is unnecessary.

The means which I have provided for locking this type of lever in its neutral position will now be described. The upper portion of the lever 10 is hollow having a drill hole 18 extending centrally therethrough from the upper ends of the same to within the bearing member 13, this hole being drilled in the lever before the same is bent. The spherical bearing member 13 has a plurality of drill holes 19 formed therein, extending inwardly to the longitudinal drill hole 18, in substantially a radial direction three equally spaced drill holes being shown in the drawing. These drill holes, it should be noted, are inclined upwardly slightly to a horizontal plane of the lever, the object of which will be hereinafter pointed out. In each of the drill holes 19 is slidably mounted a pin 20, the outer end of which is rounded, as shown, and the rounded end of each pin is adapted to be seated in a shallow recess preferably in the form of a pocket 21 formed in the inner curved wall of the socket member 14. In order to force the sliding pins 20 outwardly into locking engagement with the pockets 21, I provided a bolt or pin 22, which is rotatably mounted in the drill hole 13, this bolt, in the particular instance illustrated, being triangular in cross-section, as shown, and in order to reduce the friction between the rotating bolt 22 and the pins 20 operated thereby, anti-friction balls 23 are preferably mounted within the drill holes 19 between the operating bolt 22 and the inner ends of the sliding pins 20, the arrangement being such that when the triangular bolt 22 is turned to the position, shown in Fig. 4, the sliding pins 20 are forced outwardly into locking engagement with the socket member 14, as shown, and when the bolt 22 is rotated to the position shown in Fig. 5, the sliding pins 20 are then permitted to move inwardly sufficiently to clear the inner curved wall of the socket member 14, as will be apparent. The object in making the pockets 21 relatively shallow is to prevent the sliding pins from entering these pockets a sufficient distance to permit them to stick therein and thereby lock the lever 10 against movement after the locking bolt 22 has been turned to its unlocked position. By constructing the sliding pins and cooperating pockets in the manner above set forth, it is unnecessary to provide springs or the like to retract the pins 20 after the bolt 22 has been turned to its unlocked position, since the force of gravity to some extent will tend to move the pins 20 to their retracted position, due to the inclination of the drill holes 19, and the engagement between the rounded outer ends of the pins 20 and the pockets is such that the pins will be forced back out of engagement with the socket member 14, when the lever is moved slightly after having been unlocked.

The means which I have provided for rotating the bolt 22 from its pin protracting position, shown in Fig. 4, to the pin retracted position, shown in Fig. 5, consists of a pin tumbler lock designated in its entirety by the numeral 24, mounted in the upper end of the knob 12. This pin tumbler lock is preferably mounted in a relatively large drill hole 25, which is formed in the upper face of the knob 12 eccentrically to the axis of the knob, as shown in Figs. 2 and 3, the arrangement being such that the key barrel 26 within the lock casing will lie in alignment with the drill hole 18 extending longitudinally within the lever 10, while the pin tumbler extensions 27 and 28 with which this cylinder lock is provided lie in the clearance space formed by the eccentric drill hole, above mentioned. The lower end of the key barrel 26 is operatively connected to the triangular bolt 22 by a flexible spiral tube or the like 29, one end of which is secured to the key barrel by a pin or the like 30, and the other end of which is secured to the bolt 22 in any preferred manner. The upper end of the knob 12 is preferably dished hollowed out to form a shallow concave seat, as shown, the same being cut away to form an annular rabbet 31, and the escutcheon 32 formed upon the pin tumbler lock is preferably likewise dished and is constructed to be seated within the upper end of the knob 12 so that the curved outer face of the escutcheon plate lies flush with the edge of the rabbet 31. The object in cutting away the upper end of the knob 12 and in curving the escutcheon 32 is to form a clearance space in order that the knurled knob 33 formed upon the outer end of the key barrel may be grasped by the fingers to rotate the same from its unlocked to its locked position after the key has been removed from its key barrel. The pin tumblers within the pin tumbler extension 27 and the pin tumblers within the key barrel are of the usual construction and operate in the usual manner to lock the key barrel against rotation, but the pin tumblers 34 within the extension 28 do not operate in the usual manner, since they are of greater diameter than the other pin tumblers and, therefore, will not be forced by their operating springs into locking engagement with the key barrel. The object in providing the pin tumblers 34 is to permit the key to be removed from its key barrel when the same is turned to its unlocked position, it being understood that in order to withdraw a key from its key barrel, it is necessary to provide some means whereby the pin tumblers within the key barrel may move outwardly sufficiently to clear the bits of the key. In the construction illustrated, the pins within the key barrel are free to move outwardly when the key barrel is turned to its unlocked position, but the pins 34 cannot move into locking engagement with the key barrel, since they are too large in diameter to enter the pin tumbler sockets within this key barrel. The pin tumblers 34, however, will abut against the edge of the sockets within the key barrel and will thereby frictionally retain the key barrel in its unlocked position, the inner ends of these pins 34 preferably being rounded, as shown, in order to frictionally engage the sockets, just mentioned. The means which I have shown for fastening the pin tumbler lock 24 within the knob 12, consists in forming a drill hole transversely through the same, in which a pin 35 is driven.

The operation of my device is as follows: When it is desired to lock the lever 10, the same is moved to its neutral position, whereupon the knurled end 33 of the key barrel may be grasped by the fingers and rotated from its unlocked to its locked position, the rotation of this key barrel will rotate the triangular bolt 22 to which it is connected by the flexible tube or the like 29, and as the bolt 22 is rotated from its unlocked position, shown in Fig. 5, to its locked position, Fig. 4, the sliding pins 20 will be forced outwardly into locking engagement with the pockets 21 formed in the inner curved face of the socket member 14, and the parts will be retained in this locked position by the usual pin tumblers within the extension 27, which retain the key barrel in its locked position until a key is inserted in the same. When it is desired to unlock the gear shift lever, all that is necessary is to insert a key in its key barrel and rotate the same from its locked to its unlocked position, that is, from the position shown in Fig. 2 to the position shown in Fig. 3 of the drawing, whereupon the key may be withdrawn from its key barrel in the manner above explained. The lever is then unlocked and will remain so during the operation of the automobile in which the same is mounted, since the frictional engagement of the relatively large pin tumblers 34 with the pin tumbler sockets in the key barrel 26 will prevent the key barrel from being acidentally rotated from its unlocked to its locked position. When it is desired to lock the lever, all that is necessary is to move the same to its neutral position and then grasp the knob 33 and rotate the same to its locked position, it being unnecessary to use the key when it is desired to lock the lever against movement.

I do not claim herein the construction and operation of the cylinder lock per se, as the same is described and claimed in my divisional application Serial No. 304,449, filed June 16, 1919; but I claim this lock, herein, in only so far as is necessary to set forth the combination existing between this cylinder lock and the lever lock elements which it controls.

It will be apparent that various minor changes may be made in the device herein described without departing from the scope of my invention as defined in the annexed claims.

What I claim is:

1. In combination with a lever provided with a spherical bearing member and a socket member in which the lever is mounted for universal movement, means for locking said lever in its neutral position, comprising pins slidably mounted in said bearing member, shallow concaved pockets within said socket member, said pins having their ends shaped to snugly fit in said pockets, and key operable means for moving said pins into locking engagement with said pockets, all of said pins being forced simultaneously from said pockets by any movement of said lever when said key operable means is in unlocked position.

2. In combination with a lever provided with a spherical bearing member and a socket member in which the lever is swingingly mounted, locking means for said lever, comprising pins slidably mounted in said bearing member, said pins provided with blunt rounded ends, said socket member provided with shallow pockets having a configuration similar to the blunt rounded ends of said pins, and key controlled means for moving said pins in locking engagement with said pockets, all of said pins being forced simultaneously from said pockets by movement of said lever when said key operable means is in unlocked position.

3. In combination with a lever provided with a spherical bearing member and a socket member in which the lever is swingingly mounted, means for locking said lever against movement, comprising pins slidably mounted in said bearing member, key controlled rotatable means for forcing said pins into locking engagement with said socket member, and anti-friction means between the inner end of said pins and said key operable means.

4. In combination with a lever, a bearing member in which said lever is swingingly mounted, means within said lever slidable into and out of locking engagement with said bearing member, a rotating bolt for operating said slidable means, a lock provided with a key barrel for operating said bolt, said key barrel being manually rotatable from its unlocked to its locked position when the key is removed from the same.

5. In combination with a lever provided with a spherical bearing member and a socket member in which said lever is mounted for universal movement, means slidably mounted within said bearing member and movable into locking engagement with said socket member, a bolt rotatably mounted within said lever for operating said slidable means, a lock carried by said lever provided with a key barrel for operating said bolt, said key barrel being manually rotatable from its unlocked to its locked position while the operating key is removed therefrom.

6. In combination with a universal swinging lever provided with a spherical bearing member and a fixed substantially spherical socket member therefor, means for locking said lever against unauthorized movement, comprising locking pins mounted within said spherical bearing member and constructed to slide therein in substantially a radial direction, said pins having their outer ends rounded, shallow pockets formed within said socket member and positioned to receive the outer end of said pins, and key controlled rotatable means for forcing said pins into locking engagement with said pockets.

7. In combination with a hollow operating lever, a supporting bracket therefor, means for locking said lever to said bracket, comprising pins mounted in said lever and movable into locking engagement with said bracket, and a lock provided with a rotatable key barrel for operating said locking pins, said key barrel being manually rotatable to move said locking pins to locked position without the use of its key and with the key removed therefrom.

8. In combination with an operating lever, a supporting bracket therefor, means for locking said lever to said bracket, and a lock mounted in the upper end of said lever, said lock provided with a key barrel for operating said locking means, said key barrel being manually rotatable to move said locking means to locked position without the use of its key and with the key removed therefrom.

9. In combination with a lever provided with a spherical bearing member mounted in a socket member for universal movement, locking means for said lever, comprising several pins mounted to slide substantially radially within said spherical bearing member and to extend substantially transversely to the axis of said lever, said socket member having shallow pin receiving pockets formed therein, and means for positively moving said pins into and out of operative engagement with said pockets.

10. In combination with a lever provided with a spherical bearing member mounted in a socket member for universal movement, locking means for said lever, comprising several pins provided with rounded outer ends and mounted to slide radially within said socket member and to extend substantially transversely to the axis of said lever, said socket member having concaved recesses formed therein and positioned to receive the rounded end of each of said pins, and rotatable means for retaining said pins in their protracted position.

11. In combination with a lever provided with a spherical bearing member mounted in a socket member for universal movement, locking means for said lever, comprising several pins provided with rounded outer ends and mounted to slide radially within said socket member and to extend substantially transversely to the axis of said lever, said socket member having concaved recesses formed therein and positioned to receive the rounded end of each of said pins, each pin constructed to co-operate with the recess in which its end is seated to be positively retracted by the curvature of the recess when said lever is shifted, and rotatable means for retaining said pins in their protracted position.

12. In combination with a lever provided with a spherical bearing member movably mounted in a socket member, a pin provided with a rounded outer end mounted to slide radially within said socket member and to extend substantially at a right angle to the axis of said lever, said socket member having a recess therein curved in cross-section to conform to the curvature of said rounded end, said pin constructed to co-operate with the curvature of the recess in which it is seated to be positively retracted by said curvature when said lever is shifted, and rotatable means for retaining said pin its its protracted position.

13. In combination with a lever provided with a spherical bearing member and a socket member in which the lever is mounted for universal movement, means for locking said lever in its neutral position, comprising pins slidably mounted in said bearing member and movable into locking engagement with said socket member, rotatable means for moving said pins to their extended locking position, key controlled means, manually rotatable to move said pins to locked position, and resilient means for normally retaining said rotatable means in its inoperative position.

14. In combination with a lever provided with a spherical bearing member and a socket member in which the lever is swingingly mounted, means for locking said lever against movement, comprising pins slidably mounted in said bearing member, means for forcing all of said pins into locking engagement with said socket member and means to force all of said pins simultaneously out of engagement with said socket member upon the release of said locking means and the movement of said bearing member in any direction.

In witness whereof, I have hereunto set my hand on this 4th day of April, 1919.

HENRY G. VOIGHT.